Jan. 18, 1944.  C. KARLIK  2,339,338
DOUBLE WING AIRPLANE
Filed Dec. 18, 1941  2 Sheets-Sheet 1

INVENTOR.
Charles Karlik
BY
ATTORNEY

Jan. 18, 1944.  C. KARLIK  2,339,338
DOUBLE WING AIRPLANE
Filed Dec. 18, 1941   2 Sheets-Sheet 2

INVENTOR.
Charles Karlik
BY
ATTORNEY

Patented Jan. 18, 1944

2,339,338

UNITED STATES PATENT OFFICE 2,339,338

DOUBLE WING AIRPLANE

Charles Karlik, Flushing, N. Y.

Application December 18, 1941, Serial No. 423,427

3 Claims. (Cl. 244—13)

This invention relates to new and useful improvements in a double wing airplane.

More specifically, the invention proposes the construction of a double wing plane characterized by an extra long fuselage arranged in a manner to provide additional seating capacity or baggage space.

Still further it is proposed to provide the extra long fuselage with a wing at the front portion thereof and an additional wing mounted upon an intermediate point of said fuselage in a manner to provide additional lifting power to compensate for the increased length of the fuselage.

It is further proposed to provide a means for adjustably mounting the rear wing to be moved on the fuselage relative to the front wing in a manner to provide a balancing means to compensate for the uneven distribution of material within the fuselage.

For further comprehension of this invention, and of the objects and advantages thereof, reference will be had to the following description and accompanying drawings and to the appended claims in which the various novel features of the invention are more particularly set forth.

In the accompanying drawings forming a material part of this disclosure:

Figure 1:
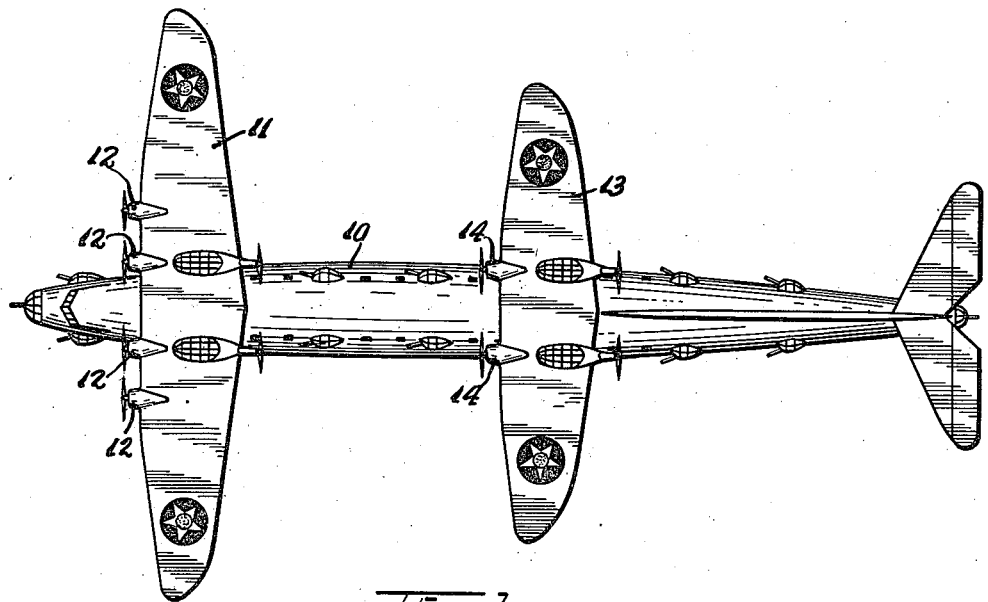
Fig. 1 is a plan view of a double wing plane constructed in accordance with this invention.
Figure 2:
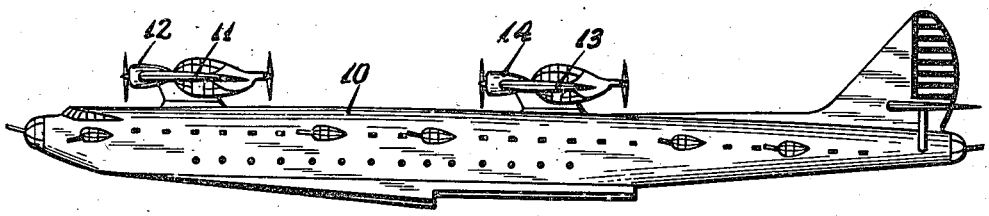
Fig. 2 is a side elevational view of Fig. 1.
Figure 3:
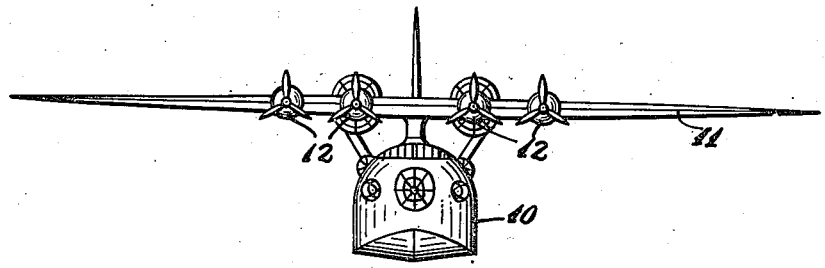
Fig. 3 is a front elevational view of Fig. 1.

The double wing plane, according to this invention, includes an extra long fuselage 10 providing additional seating capacity or increased interior space for the carrying of larger quantities of baggage. A wing 11 is mounted on the front portion of the fuselage slightly to the rear of the control cabin. The leading edge of this wing 11 is provided with four adjacent motors 12.

An additional wing 13 which is narrower than the wing 11 is mounted on an intermediate point of the fuselage. This wing 13 is provided upon its leading edge with a pair of adjacent motors 14. The wing 13 is provided for the purpose of giving the fuselage additional lifting power over that provided by the wing 11 to compensate for the increased length of the fuselage 10 and permit the plane to rise into the air.

Figure 4:
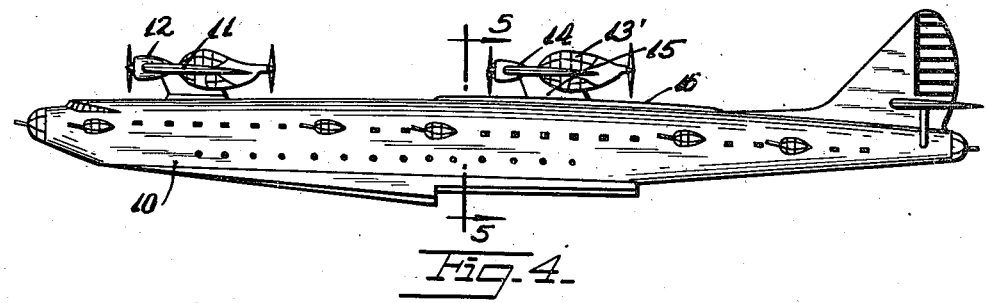
Fig. 4 is a view similar to Fig. 2 but illustrating a modification of the invention.
Figure 5:
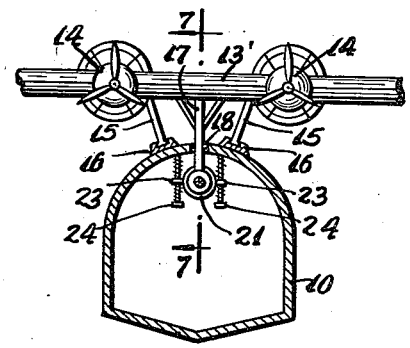
Fig. 5 is a vertical sectional view taken substantially on the line 5—5 of Fig. 4.
Figure 7:
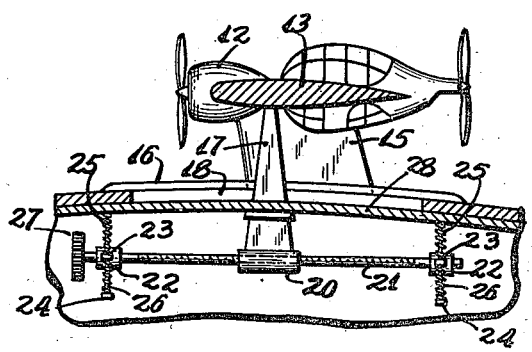
Fig. 7 is a vertical sectional view taken on the line 7—7 of Fig. 5.
Figure 6:
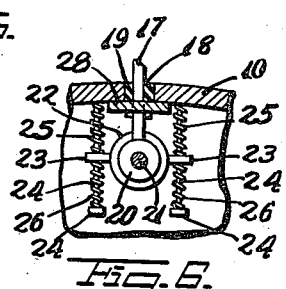
Fig. 6 is an enlarged detailed view of a portion of Fig. 5.

According to the modification of the invention shown in Figs. 4–7 the rear wing 13' is provided with downwardly extending leg members 15 which slidably engage into arcuately shaped tracks 16 mounted upon the top portion of the fuselage 10. This inter-engagement of the legs 15 with the track 16 slidably supports the rear wing 13' and permits it to be moved relative to the front wing 11 for shifting the center of balance to compensate for the uneven distribution of material within the fuselage 10.

Means is provided within the fuselage 10 whereby the wing 13' may be shifted relative to the front wing 11. This means comprises a bracket 17 extending from the bottom of the rear wing 13' through a slot 18 formed in the top of the fuselage 10. Sponge rubber material 19 is mounted upon opposite sides of the slot 18 and normally closes this slot but is soft enough to permit the passage of the bracket 17 along the length of this slot. The bottom end of the bracket 17 within the fuselage 10 is provided with a follower 20 which threadedly engages a rotatively supported straight screw 21 which extends parallel to the tracks 16. The ends of the screw 21 are rotatively supported in blocks 22 which are provided on their opposite sides with outwardly extending lugs 23. These lugs 23 are formed with openings through which rods 24 slidably extend. These rods 24 extend from the roof of the fuselage 10 and there are two rods for each block 22 and they are disposed on opposite sides thereof. Springs 24 are mounted upon the top portions of the rods 22 and engage the top faces of the lugs 23. Complementary springs 26 are mounted upon the bottom portions of the rods 24 and counter-act the action of the springs 25 to maintain the lugs 23 disposed centrally on the rods 24.

There is a sufficient tolerance between the openings in the lugs 23 through which the rods 24 extend to permit movement of the blocks 22 in an up and down direction relative to each other as the wing 13' is moved along the length of the arcuately shaped tracks 16. One end of the screw 21 is provided with a gear 27 which is adapted to be engaged with a drive element, not shown on the drawings, for rotating the screw in one direction or the other for moving the wing 13' either forwards or rearwards.

A shutter 28 is mounted on the bracket 17 and is in face contact with the top wall of the fuselage 10 to assist the sponge rubber elements 19 in closing the slot 18.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secured by United States Letters Patent is:

1. An airplane having a fuselage with an arcuate top wall and a wing superimposed on said top wall, longitudinally extending spaced tracks mounted on said top wall and being curved to conform with the curvature of said top wall, legs formed on said wing and slidably engaging said tracks permitting said wing to be moved to various adjusted positions along said tracks, a horizontal straight screw within said fuselage beneath said top wall, a follower on said wing and projected into said fuselage through a slot formed in said top wall and threadedly engaging said screw, means for rotating said screw in one direction or the other to move said wing forwards or rearwards of said fuselage, and means for vertically slidably supporting the ends of said horizontal screw permitting the inner end of said follower to move along an arcuate path as said wing moves along said arcuate tracks.

2. An airplane having a fuselage with an arcuate top wall and a wing superimposed on said top wall, longitudinally extending spaced tracks mounted on said top wall and being curved to conform with the curvature of said top wall, legs formed on said wing and slidably engaging said tracks permitting said wing to be moved to various adjusted positions along said tracks, a horizontal straight screw within said fuselage beneath said top wall, a follower on said wing and projected into said fuselage through a slot formed in said top wall and threadedly engaging said screw, means for rotating said screw in one direction or the other to move said wing forwards or rearwards of said fuselage, and means for vertically slidably supporting the ends of said horizontal screw permitting the inner end of said follower to move along an arcuate path as said wing moves along said arcuate tracks, comprising vertical rods extending from said top wall and along opposite sides of the ends of said horizontal screw, blocks rotatively supporting the ends of said horizontal screws, lugs extending from opposite sides of said blocks and slidably engaging said rods, and resilient means mounting said blocks in a central position along the length of said rods.

3. An airplane having a fuselage with an arcuate top wall and a wing superimposed on said top wall, longitudinally extending spaced tracks mounted on said top wall and being curved to conform with the curvature of said top wall, legs formed on said wing and slidably engaging said tracks permitting said wing to be moved to various adjusted positions along said tracks, a horizontal straight screw within said fuselage beneath said top wall, a follower on said wing and projected into said fuselage through a slot formed in said top wall and threadedly engaging said screw, means for rotating said screw in one direction or the other to move said wing forwards or rearwards of said fuselage, and means for vertically slidably supporting the ends of said horizontal screw permitting the inner end of said follower to move along an arcuate path as said wing moves along said arcuate tracks, comprising vertical rods extending from said top wall and along opposite sides of the ends of said horizontal screw, blocks rotatively supporting the ends of said horizontal screw, lugs extending from opposite sides of said blocks and slidably engaging said rods, and resilient means mounting said blocks in a central position along the length of said rods, said resilient means, comprising a pair of springs mounted on each of said vertical rods and having adjacent ends engaging opposite sides of said lugs.

CHARLES KARLIK.